United States Patent

Hagimori et al.

[11] Patent Number: 5,459,189
[45] Date of Patent: Oct. 17, 1995

[54] THERMOPLASTIC RESIN COMPOSITION

[75] Inventors: Hiroshi Hagimori; Yasuro Suzuki; Kaoru Kitadono; Takashi Sanada, all of Chiba, Japan

[73] Assignee: Sumitomo Chemical Company, Ltd., Osaka, Japan

[21] Appl. No.: 185,028

[22] Filed: Jan. 24, 1994

Related U.S. Application Data

[63] Continuation-in-part of Ser. No. 948,414, Sep. 22, 1992, abandoned, which is a continuation-in-part of Ser. No. 819,235, Jan. 10, 1992, abandoned, which is a continuation-in-part of Ser. No. 769,436, Oct. 2, 1991, abandoned.

[51] Int. Cl.$^6$ .............................. C08K 3/08; C08L 71/12
[52] U.S. Cl. .......................... 524/439; 524/440; 524/441; 525/392; 525/397
[58] Field of Search .................... 524/439, 440, 524/441; 525/392, 397

[56] References Cited

U.S. PATENT DOCUMENTS

| | | | |
|---|---|---|---|
| 4,404,125 | 9/1983 | Abolins et al. | 525/132 |
| 4,493,915 | 9/1985 | Lohmeijer | 524/87 |
| 4,566,990 | 1/1986 | Liu et al. | 524/439 |
| 4,600,741 | 7/1986 | Aycock et al. | 525/397 |
| 4,743,651 | 5/1988 | Shibuya et al. | 525/92 |
| 4,859,739 | 8/1989 | Yates et al. | 525/92 |
| 4,874,810 | 10/1989 | Lee, Jr. et al. | 525/92 |
| 4,968,749 | 11/1990 | Shibuya et al. | 525/92 |
| 5,047,448 | 9/1991 | Tanaka et al. | 524/439 |
| 5,059,646 | 10/1991 | Morioka et al. | 525/68 |
| 5,086,105 | 2/1992 | Abe et al. | 525/68 |
| 5,134,196 | 7/1992 | van der Meer | 525/92 |
| 5,145,904 | 9/1992 | Muehlbach et al. | 524/611 |

FOREIGN PATENT DOCUMENTS

| | | |
|---|---|---|
| 77059 | 4/1983 | European Pat. Off. . |
| 416435 | 3/1991 | European Pat. Off. . |

OTHER PUBLICATIONS

Database WIPL, Section Ch, Week 9049, Mar. 31, 1989, Derwent Publications Ltd., London, GB; Class A, p. 441, AN 364565 & JP-A-2 261 861 *abstract*.

*Primary Examiner*—Paul R. Michl
*Assistant Examiner*—Olga Asinevsky
*Attorney, Agent, or Firm*—Cushman Darby & Cushman

[57] ABSTRACT

A resin composition having improved resistance to discoloration caused by exposure to light, which comprises (a) 5–95% by weight of a polyphenylene ether alone or in combination with a styrene polymer, (b) 95–5% by weight of a polyamide, and based on 100 parts by weight of the sum of (a) and (b), (c) 0.01–30 parts by weight of one or more agents to improve the compatibility of a polyphenylene ether and a polyamide, (d) 0–50 parts by weight of one or more agents to improve the impact resistance, and (e) 0.1–15 parts by weight of metal particles having 10 μm or less of weight average particle size and 3 or more of aspect ratio, and 60% by weight or more of (e) metal particles being included in (b) a polyamide.

9 Claims, No Drawings

THERMOPLASTIC RESIN COMPOSITION

This is a continuation-in-part of application Ser. No. 07/948,414, filed Sep. 22, 1992, which is a continuation-in-part of application Ser. No. 07/819,235, filed Jan. 10, 1992, which is a continuation-in-part of application Ser. No. 07/769,436, filed Oct. 2, 1991, all now abandoned.

The present invention relates to a novel resin composition having improved resistance to discoloration caused by exposure to light, which comprises;

(a) a polyphenylene ether alone or in combination with a styrene polymer, (b) a polyamide, (c) one or more of compatibilizing agents to improve the polyphenylene ether and the polyamide, (d) optionally one or more of agents to improve the impact strength, and (e) metal particles having 10 μm or less of weight average particle size and 3 or more of aspect ratio.

Blends of polyphenylene ether and polyamide have long been known. U.S. Pat. No. 3,379,792 taught improved processability of polyphenylene ethers by incorporating therein up to 25% by weight of polyamide.

Recently compatibility of such blends have been enhanced by incorporating therein a compatibilizing agent.

U.S. Pat. No. 4,315,086 teaches the use of liquid diene polymers, epoxy compounds and compounds having in the molecule both (a) a carbon-carbon double bond or a carbon-carbon triple bond and (b) a carboxylic acid, acid anhydride, acid amide, imide, carboxylic acid ester, amino or hydroxyl group as compatibilizers. EP 46040 teaches copolymers of vinyl aromatic compounds and either an alpha, beta-unsaturated dicarboxylic acid anhydride or an imide compound thereof as a compatibilizer.

As for the third components, U.S. Pat. No. 4,659,763 teaches the use of quinone compounds, U.S. Pat. No. 4,600,741 teaches the use of trimellitic anhydride acid chloride and the like, U.S. Pat. No. 4,659,760 teaches the use of oxidized polyethylene wax, WO 85/05372 teaches the use of polycarboxylic acids such as citric acid, WO 87/07281 teaches the use of vinyltrimethoxy silane as compatibilizers. U.S. Pat. No. 5,059,646 teaches the use of the organo-phosphorus compounds, U.S. Pat. No. 4,874,810 teaches the use of glass fiber, and U.S. Pat. No. 5,086,105 teaches the use of maleic anhydride as a compatibilizer and filler or glass fiber.

It is also known to add various rubbery polymers and copolymers to further enhance the impact strength of the foregoing compatibilized polyphenylene ether-polyamide blends, as described in U.S. Pat. No. 5,134,196.

While the foregoing polyphenylene etherpolyamide blends exhibit enhanced melt flow property, improved chemical resistance, and if compatibilized, excellent mechanical properties, they have one big drawback in that they can be readily discolored by exposure to light. Further the discoloration can be observed even in case of a fabricated article which surface is coated by a paint coat layer depending on the thickness and color of the layer.

Therefore it is an object of the present invention to provide a polyphenylene ether-polyamide composition having an improved discoloration resistance.

Blends of a thermoplastic and metal particles have been known. U.S. Pat. No. 4,566,990 and U.S. Pat. No. 5,047,448 teach a polyamide-containing composition wherein metal particles are incorporated, having higher electroconductivity or antimicrobial function. On the other hand, blends of a polyphenylene ether and a metal powder have also long been known. U.S. Pat. No. 4,404,125 teaches a polyphenylene ether-polystyrene composition wherein aluminium powder and carbon black are incorporated, having higher electroconductivity. Further, U.S. Pat. No. 4,493,915 teaches a polyphenylene ether composition containing a specific dyestuff having an improved discoloration resistance. However, no mention was made as to an improvement of the discoloration resistance using specific metal particles in polyphenylene ether-polyamide composition.

It has been quite unexpectedly discovered that the discoloration resistance of a polyphenylene ether-polyamide composition can be improved by incorporating metal particles therein defined below.

SUMMARY OF THE INVENTION

According to the present invention, a polyphenylene ether-polyamide composition having unexpectedly improved resistance to discoloration caused by exposure to light may be prepared by incorporating discoloration-improving quantity of metal particles in the polyphenylene ether-polyamide composition.

In general the composition of the present invention is prepared from a resin composition comprising, (a) 5–95% by weight of at least one polyphenylene ether alone or in combination with a styrene polymer, (b) 95–5% by weight of at least one polyamide, and based on 100 parts by weight of the sum of (a) and (b), (c) 0.01–30 parts by weight of one or more of agents to improve the compatibility of the polyphenylene ether and the polyamide, (d) 0–50 parts by weight of one or more of agents to improve the impact strength of the composition and, (e) 0.1–15 parts by weight of metal particles having 10 μm or less of weight average particle size and 3 or more of aspect ratio, and 60% by weight or more of (e) metal particles being included in (b) a polyamide.

The composition of the present invention will preferably be prepared from 30 to 70 percent by weight of polyphenylene ether alone or in combination with a styrene (a), and preferably from 30 to 70 percent by weight of polyamide (b), and from about 0.1 to about 15, preferably from about 0.5 to about 10 parts by weight of metal particles (e) based on 100 parts by weight of the sum of the polyphenylene ether (a) and the polyamide (b).

One or more of the compatibilizing agents (c) is used in an amount of from about 0.01 to 30, preferably from about 0.1 to about 5 parts by weight based on 100 parts by weight of the sum of the polyphenylene ether (a) and the polyamide (b). When employed, the agent to improve impact strength (d) will be used in an amount of from about 1 to about 50 parts, preferably from about 5 to about 30 parts by weight based on 100 parts by weight of the sum of the polyphenylene ether (a) and the polyamide (b).

DETAILED DESCRIPTION OF THE INVENTION

The polyphenylene ether (a) used in the present invention is homopolymer or copolymer composed of the following repeating unit (I) or (I) and (II):

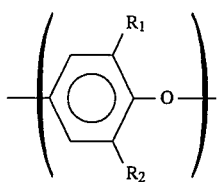
(I)

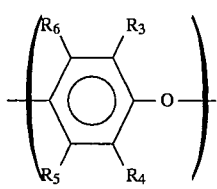
(II)

wherein $R_1$, $R_2$, $R_3$, $R_4$, $R_5$ and $R_6$, which may be identical or different, each represents a monovalent residue such as an alkyl group of 1–4 carbon atoms excluding tert-butyl group, an aryl group, a halogen atom or a hydrogen atom, and $R_3$ and $R_5$ cannot be simultaneously hydrogen atoms.

The polyphenylene ether may be a mixture of said homopolymer and said copolymer, or a graft copolymer of said polymer with styrene.

The homopolymer of polyphenylene ether includes poly(2,6-dimethyl-,1,4-phenylene)ether, poly-(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloro-1,4-phenylene)ether, poly(2-methyl-6-hydroxyethyl-1,4-phenylene)ether and poly(2-methyl-6-chloroethyl-1,4-phenylene)ether.

The copolymer of polyphenylene ether includes polyphenylene ether copolymers mainly composed of polyphenylene ether structure which is obtained by copolymerization with o-cresol or an alkyl-substituted phenol such as 2,3,6-trimethylphenol, which is represented by the formula (III):

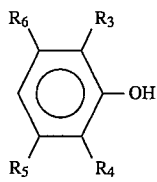
(III)

wherein $R_3$, $R_4$, $R_5$ and $R_6$ each represents a monovalent residue such as an alkyl group of 1–4 carbon atoms excluding tert-butyl group, an aryl group, a halogen atom or a hydrogen atom, and $R_3$ and $R_5$ cannot be simultaneously hydrogen atoms. Preferably, said polyphenylene ether (a) has a reduced viscosity of 0.25–0.70 dl/g, measured at 25° C. in a chloroform solution of 0.5 g/dl concentration.

The polyamide component (b) used in the present invention is well known in the art and may be selected from any of aliphatic polyamides or thermoplastic aromatic copolyamides or a combination thereof. The aliphatic polyamides have a molecular weight of 10,000 or more and can be produced by bonding equimolars of a saturated aliphatic dicarboxylic acid of 4–12 carbon atoms and an aliphatic diamine of 2–12 carbon atoms. However, in the production, if necessary, the diamines may be excessively used so as to provide more amine terminal groups than carboxyl terminal groups in the polyamide. Alternatively, a dibasic acid may be excessively used so as to provide more acid groups. Similarly, these polyamides can be conveniently produced from acid production derivatives and amine production derivatives such as esters, acid chlorides and amine salts of the above mentioned acids and amines.

Typical examples of the aliphatic dicarboxylic acid used for the production of the polyamides include adipic acid, pimelic acid, azelaic acid, suberic acid, sebacic acid and dodecanedioic acid.

On the other hand, typical examples of the aliphatic diamines include hexamethylenediamine and octamethylenediamine, and the like.

In addition, the aliphatic polyamides may also be produced by self-condensation of lactam.

Examples of the aliphatic polyamides are polyhexamethylene adipamide (nylon 66), polyhexamethylene azelamide (nylon 69), polyhexamethylene sebacamide (nylon 610), polyhexamethylene dodecanamide (nylon 612), poly-bis-(p-aminocyclohexyl)methane dodecanoamide, polytetramethylene adipamide (nylon 46) and polyamides produced by ring cleavage of lactam such as polycaprolactam (nylon 6) and polylauryl lactam. Furthermore, there may be used polyamides produced by polymerization of at least two amines or acids selected from those used for the production of the above-mentioned polymers, for example, polymers produced from adipic acid, sebacic acid and hexamethylenediamine. The aliphatic polyamides further include blends of above-mentioned polyamides such as a blend of nylon 6 and nylon 66 including copolymers such as nylon 66/6.

Preferably, the aliphatic polyamides used in the present invention are polyhexamethylene adipamide (nylon 66), polycaprolactam (nylon 6) and a blend of polyhexamethylene adipamide (nylon 66) with polycaprolactam (nylon 6).

The thermoplastic aromatic copolyamide is a copolyamide containing an aromatic component therein, for example, polyhexamethylene isophthalamide (nylon 6I). The copolyamide containing an aromatic component therein means a melt-polymerizable polyamide containing as a main component an aromatic amino acid and/or an aromatic dicarboxylic acid such as para-aminomethylbenzoic acid, para-aminoethylbenzoic acid, terephthalic acid and isophthalic acid.

Diamines which may constitute another component of the polyamide include hexamethylenediamine, undecamethylenediamine, dodecamethylenediamine, 2,2,4-/2,4,4-trimethylhexamethylenediamine, m-xylylenediamine, p-xylylenediamine, bis(p-aminocyclohexyl)methane, bis(p-aminocyclohexyl)propane, bis(3-methyl-4-aminocyclohexyl)methane, 1,3-bis(aminomethyl)cyclohexane and 1,4-bis(aminomethyl)cyclohexane. An isocyanate may also be used in place of the diamine.

Any other comonomers may be used, if necessary. Examples of the comonomers are 4,4'-diphenylmethane diisocyanate and tolylene diisocyanate. Other examples thereof are a unit of lactam, a unit of ω-amino acid of 4–12 carbon atoms, a compound derived from an aliphatic dicarboxylic acid of 4–12 carbon atoms and an aliphatic diamines of 2–12 carbon atoms, for example, lactams and amino acids such as ε-caprolactam, ω-caprolactam, 11-aminoundecanoic acid and 12-aminododecanoic acid, and equimolars salts of the above-mentioned various diamines and adipic acid, azelaic acid or sebacic acid.

Typical examples of the thermoplastic aromatic copolyamides comprising these components are copolymer polyamide of p-aminomethylbenzoic acid and ε-caprolactam (nylon AMBA/6), polyamides mainly composed of 2,2,4-/2,4,4-trimethylhexamethylene.terephthalamide (nylon TMDT and nylon TMDT/6I), polyamides mainly composed of hexamethylene-isophthalamide and/or hexamethylene-terephthalamide and containing, as a comonomer, bis(p-aminocyclohexyl)methane.terephthalamide, and/or bis(3-methyl-4-aminocyclohexyl) methane.isophthalamide and/or bis(3-methyl-4-aminocyclohexyl) propane.isophthalamide and/or bis(p-aminocyclohexyl)-propane.terephthalamide (nylon 6I/PACM I, nylon 6I/DMPACM I, nylon 6I/PACP I, nylon 6I/6T/PACM I/PACM T, nylon 6I/6T/DMPACM I/DMPACM T, nylon 6I/6T/PACP I/PACP T), polyamides mainly composed of hexamethylene.isophthalamide or hexamethylene-terephthalamide and containing, as a comonomer, ε-caprolactam, 12-aminododecanoic acid, hexamethylene-adipamide, bis(p-aminocyclohexyl)methane.adipamide or bis(3-methyl-4-aminocyclohexyl)methane.adipamide (nylon 6I, 6I/6T, 6I/12, 6T/6, 6T/66, 6I/PACM 6, 6I/DMPACM 6), and polyamides mainly composed of bis(p-aminocyclohexyl)methane.isophthalamide or bis(3-methyl-4-aminocyclohexyl)methane.isophthalamide and containing, as a comonomer, hexamethylene.dodecanedioamide or 12-amino-dodecanoic acid (nylon PACM I/612 and nylon DMPACM I/12).

The aromatic nuclear-hydrogenated copolyamide of component (b) is an alicyclic copolyamide obtained by using cyclohexane 1,4-dicarboxylic acid or cyclohexane 1,3-dicarboxylic acid obtained by nuclear-hydrogenation of terephthalic acid or isophthalic acid in place of terephthalic acid or isophthalic acid which is an acid component of the above-mentioned aromatic copolyamides. Furthermore, nuclear hydrogenation product of diamines or diisocyanates such as 4,4'-diphenylmethane diisocyanate or tolylene diisocyanate, may also be used as a monomer.

Preferably, said polyamide (b) has a number average molecular weight of 10,000–50,000 determined by GPC method.

Examples of compatibilizing agents (c) which are employed in the practice of the present invention are a) liquid diene polymers, b) epoxy compounds, c) unsaturated functional compounds, d) aliphatic polycarboxylic acid compounds or the derivatives thereof as described hereunder, e) polyfunctional acid halide compounds as described hereunder, and f) copolymers of vinyl aromatic compound and either an α–β unsaturated dicarboxyl acid anhydride or an imido compound thereof.

Liquid diene polymers a) suitable for use herein include homopolymers of a conjugated diene and copolymers of a conjugated diene with at least one monomer selected from the group consisting of other conjugated dienes, vinyl monomers, e.g. ethylene, propylene, butene-1, isobutylene, hexene-1, octene-1 and dodecene-1, and mixtures thereof, having a number average molecular weight of from 150 to 10,000 preferably 150 to 5,000. These homopolymers and copolymers include, among others, polybutadiene, polyisoprene, poly(1,3-pentadiene), poly(butadieneisoprene), poly(styrene-butadiene), polychloroprene, poly(butadiene-alpha methyl styrene), poly(butadiene-styrene-isoprene), poly(butylene-butadiene) and the like.

Epoxy compounds b) suitable for use in the practice of the present invention are (1) epoxy resins produced by condensing polyhydric phenols (e.g. bisphenol-A, tetrabromo-bisphenol-A, resorcinol and hydroquinone) and epichlorohydrin; (2) epoxy resins produced by condensing polyhydric alcohols (e.g. ethylene glycol, propylene glycol, butylene glycol, polyethylene glycol, polypropylene glycol, pentaerythritol and trimethylolethane and the like) and epichlorohydrin; (3) glycidyletherified products of monohydric compounds including phenyl glycidylether, allyl glycidylether, butyl glycidylether and cresyl glycidylether; (4) glycidyl derivatives of amino compounds for example, the diglycidyl derivative of aniline, and (5) epoxidized products of higher olefinic or cycloalkene, or natural unsaturated oils (e.g. soybean oil) as well as of the foregoing liquid diene polymers.

The unsaturated functional compounds c) are those having in the molecule both (a) an ethylenic carbon-carbon double bond or a carbon-carbon triple bond and (b) at least one carboxylic acid, acid anhydride, acid halide, acid halide anhydride, acid amide, acid ester, imido, amino, or hydroxy group. Examples of such unsaturated polyfunctional compounds are maleic acid; maleic anhydride; fumaric acid; citranoic acid; itaconic acid; maleimido; maleic hydrazine; reaction products resulting from a diamine and maleic anhydride, maleic acid, fumaric acid, etc.; dichloromaleic anhydride; maleic acidamide; unsaturated monocarboxylic acid (such as acrylic acid, butenoic acid, methacrylic acid, t-butylacrylic acid, pentenoic acid); decenoic acids, undecenoic acids, dodecenoic acids, linoleic acid); esters, acid amides or anhydrides of the foregoing unsaturated carboxylic acids including glycidyl(meth)acrylate; unsaturated alcohols (such as allyl alcohol, crotyl alcohol, methyl vinyl carbinol, 4-pentene-1-ol, 1,4-hexadiene- 3-ol, 3-butene-1,4-diol, 2,5-dimethyl-3-hexene- 2,5-diol and alcohols of the formula $C_nH_{2n-5}OH$, $C_nH_{2n-7}OH$ and $C_nH_{2n-9}OH$, wherein n is a positive integer up to 30), unsaturated amines resulting from replacing the —OH group(s) of the above unsaturated alcohols with $NH_2$ groups; and functionalized diene polymers and copolymers.

The aliphatic polycarboxylic acid compounds or the derivatives thereof d) suitable are represented by the formula:

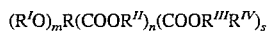

wherein R is a linear or branched chain, saturated aliphatic hydrocarbon of from 2 to 20, preferably 2 to 10 carbon atoms; $R^I$ is selected from the group consisting of hydrogen or an alkyl, aryl, acyl or carbonyl dioxy group of 1 to 10, preferably 1 to 6, most preferably 1 to 4 carbon atoms, especially preferred is hydrogen; each $R^{II}$ is independently selected from the group consisting of hydrogen or an alkyl or aryl group of from 1 to 20 carbon atoms, preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4 carbon atoms; m is equal to 1 and (n+s) is greater than or equal to 2, preferably equal to 2 or 3, and n and s are each greater than or equal to zero and wherein ($OR^I$) is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Illustrative examples of suitable polycarboxylic acids are citric acid, malic acid, and agaricic acid.

The polyfunctional acid halide compounds e) suitable for use herein are characterized as having both (a) at least one acid halide group, preferably acid chloride group and (b) at least one carboxylic acid, carboxylic acid anhydride, acid ester or acid amide group, preferably a carboxylic acid or carboxylic acid anhydride group. Examples of compatibilizers within this group are trimellitic anhydride acid chloride, chloroformyl succinic anhydride, and the like.

Examples of the agents (d) to improve the impact strength that may be employed in the practice of the present invention are, a) polyolefins
b) ethylene/olefin copolymer rubbers
c) ethylene/olefin/polyene terpolymer rubbers
d) functionalized aforementioned olefin polymers by grafting at least one unsaturated functional compound thereto,
e) styrene-grafted ethylene/olefin/polyene terpolymer rubbers
f) styrene/acrylonitrile or methyl methacrylate-grafted ethylene/olefin/polyene terpolymer rubbers
g) copolymers or terpolymers of ethylene and at least one unsaturated functional compound,
h) diene rubbers
i) hydrogenated or nonhydrogenated block copolymers of vinyl aromatic compound and diene.

Polyolefins a) suitable for use in the practice of the present invention include high density polyethylene, low density polyethylene, linear low density polyethylene, polypropylene, crystalline propylene/ethylene copolymer, polybutene-1, polymethylpenten-1, polyisobutylene and the like. Ethylene/olefin copolymer rubbers b) for use in the practice of the present invention include ethylene/propylene copolymer rubber, often called EPR, ethylene/butene-1 copolymer rubber and the like. Ethylene/olefin/polyene terpolymer rubbers c) for use in the practice of the present invention include ethylene/propylene/ethylidenenorbornen terpolymer rubber, ethylene/propylene/dicyclopentadiene terpolymer rubber, ethylene/propylene/1,4 hexadiene terpolymer rubber and the like, often called EPDM. Functionalized olefin polymers d) useful for the practice of the present invention include olefin polymers described in the above a), b) and c) with at least one unsaturated functional compound-grafted thereto.

The illustrative examples of the unsaturated functional compounds are acrylic acid, methacrylic acid, alkylester derivatives thereof such as methyl(meth)acrylate, ethyl(meth)acrylate, butyl(meth)acrylate and the like, dicarboxylic acid or acid anhydride such as fumaric acid, maleic acid, maleic anhydride, itaconic acid and the like, acrylamide, N-(hydroxymethyl)acrylamide, glycidyl derivatives of (meth)acrylic acid such as glycidyl (meth)acrylate, vinyl acetate, vinyl chloride, styrene and the like. Method for the grafting of an unsaturated functional compound to the olefin polymers is not critical in the practice of the present invention and any known method in the art may be employed. Melt mixing the olefin polymers and the unsaturated functional compounds with a suitable amount a free radical initiator may be employed. Grafting an unsaturated (functional) compound under an aqueous suspension of olefin polymers with a suitable amount of a free radical initiator and a dispersing agent may also suitably be employed. Copolymers or terpolymers of ethylene and at least one unsaturated functional compound g) useful for the practice of the present invention include ethylene/(meth)acrylic acid copolymer, ethylene/alkyl(meth)acrylate copolymer, ethylene/vinyl acetate copolymer, ethylene/alkyl(meth)acrylate/ maleic anhydride terpolymer, ethylene/methyl(meth)acrylate/glycidyl (meth)acrylate terpolymer and the like.

Diene rubbers h) useful for the practice of the present invention include polybutadiene, styrene/butadiene random copolymer, often called SBR, natural rubber, polyisoprene, and the like.

Hydrogenated or nonhydrogenated block copolymers of vinyl aromatic compound and diene i) are well known in the art. Illustrative examples of the block copolymers are styrene/butadiene diblock-copolymer, styrene/isoprene diblock copolymer, styrene/butadiene/styrene triblock copolymer, styrene/isoprene/styrene triblock copolymer, radial teleblock copolymers of styrene and butadiene, hydrogenated products of the foregoing block copolymers and the like. The foregoing impact strength improver may be used alone or in any combination of one another.

Examples of metal particles (e) having 10 μm or less of weight average particle size and 3 or more of aspect ratio used for the practice of the present invention are flakes or powders of aluminium, magnesium, zinc, stainless steel, nickel, manganese, copper or the like. Most preferred metal particles are flakes or powders of aluminium having preferably 5 or more of aspect ratio. The metal particles, at least 60%, preferably 80% or more thereof, have to be dispersed in a matrix of polyamide (b). Little improvement is obtained in respect to resistance to discoloration caused by exposure to light when the metal particles are mainly dispersed in polyphenylene ether (a) in place of the polyamide (b). The metal particles are blended with a pre-blend of polyphenylene ether/polyamide alloy, in order to have the metal particles dispersed in the polyamide matrix. Alternatively, polyamide together with the metal particles are blended with a polyphenylene ether/compasitibilizers mixture.

The foregoing polyphenylene ether/polyamide blends may further comprise inorganic fillers such as talc, aluminosilicate, mica, carbon black, glass fiber and the like, pigments, heat stabilizers, ultraviolet degradation inhibitors, antioxidants, flame retardants, plasticizers and the like.

The molded products obtained from the thermoplastic resin composition of the present invention can be used suitably for automobile parts and electrical and electronic parts.

As examples of automobile parts to which the composition of the present invention can be applied, mention may be made of exterior trim parts such as bumper, fender, apron, hood panel, fascia, rocker panel, rocker panel reinforce, floor panel, rear quarter panel, door panel, door support, roof top and trunk lid; interior trim parts such as instrument panel, console box, glove box, shift knob, pillar garnish, door trim, handle, arm rest, wind louver, carpet, seat belt and seat; interior parts of engine room such as distributor cap, air cleaner, radiator tank, battery case, radiator shroud, washer tank, cooling fan and heater case; mirror body, wheel cover, trunk trim, trunk mat and the like.

The following examples further illustrate the present invention, but the present invention is not limited to them.

In the preparation of the polyphenylene ether/polyamide blends disclosed in the examples herein, a twin screw extruder TEM-50 made by Toshiba KIKAI Kabushiki Kaisha was used.

The extruder had L/D ratio of 36 and was equipped with a first feed opening at the position of L/D ratio of 1 and with a second feed opening at the position of L/D ratio of 18 (L: the length of the screw; D: the diameter of the screw).

The cylinder temperature was set at about 260° C. and screw speed was set at 360 rpm. The formulation of the individual blend was shown in Table 1. The degree of discoloration measured of each blend was also shown in Table-1.

In Table-1, metal particles, compatibilizer, and free radical initiator were shown in parts by weight per 100 parts of the total of the polymeric materials and each of the polymeric materials was shown in weight % of the total of the polymeric materials.

The ingredients listed in the column "Feed-1" of Table-1 were fed from the first feed opening. The ingredients listed in the column "Feed-2" of Table-1 were fed from the second feed opening. All ingredients fed together either from the first feed opening or the second feed opening were mixed well by a tumbler mixer prior to the feeding.

The feed rate of the first feed and the second feed were controlled by the automatic weight feed control system so as to maintain the formulation of the individual blend as specified in Table-1.

The polyphenylene ether employed in the examples was polyphenylene ether having a reduced viscosity of 0.56 dl/g, (hereinafter denoted as PPE measured at 25° C. in a chloroform solution of 0.5 g/dl concentration manufactured by Nippon Polyether Kabushiki Kaisha.

The polyamide 6, if employed, was Unitika Kabushiki Kaisha's Nylon 6 A1030 BRL throughout the examples. The polyamide 66, if employed, was UBE Kosan Kabushiki Kaisha's UBE nylon 66 2015B.

The aromatic polyamides in the examples, if employed, was either EMS Chemis Grivory® XE3038 or Huels AG's Trogamide® T 2010.

The free radical initiator, if employed, was dicumyl peroxide, Sanperox® DCP made by Sanken Kako Kabushiki Kaisha. The free radical initiator, if employed, was always preblended with polyphenylene ether and fed from the first feed opening. Polyphenylene ether was always fed from the first feed opening and polyamides were always fed from the second opening.

The agent to improve the impact strength used in the examples were as follows.

1) Styrene-grafted EPDM denoted hereinafter as Sg-EPDM, if employed in any of the examples herein, was prepared in the following manner.

In a 100 liter stainless steel autoclave, 10 kg of finely crashed EPDM (Esprene® 502 made by Sumitomo Chemical Co., Ltd.) and 45 kg of demineralized water were fed and intensively stirred by a stirrer. While stirring, a solution of 75 gram of benzoil peroxide in 4 kg of styrene, and a solution of 400 gram of polyvinyl-alcohol (Gosenol GL-05) as a dispersion stabilizer in 10 kg of demineralized water were added in order. The mixture was stirred for one hour at a room temperature to render the impregnation of styrene and the free radical initiator into the EPDM. Then the grafting reaction was allowed at 90 degree centigrade for 6 hours and subsequently at 115 degree centigrade for 2 hours.

After the reaction was over, the resulting product was filtered, washed with demineralized water and dried to obtain about 14 kg of styrene-grafted EPDM (Sg-EPDM). Thus obtained Sg-EPDM contained about 29 weight percent of polystyrene of which about 8 weight percent was ungrafted free homopolystyrene.

2) Styrene/acrylonitrile-grafted EPDM denoted hereinafter as SAg-EPDM, if employed in any of the examples herein was prepared in the following manner.

In a 100 liter stainless steel autoclave, 10 kg of EPDM (Esprene® E502 made by Sumitomo Chemical Co., Ltd.) and 45 kg of demineralized water were fed and intensively stirred by a stirrer.

While stirring, a solution of 75 gram of benzoyl peroxide in 3.35 kg of styrene and 0.2 kg of acrylonitrile, and a solution of 400 gram of polyvinyl alcohol (Gesenol GL-05 made by Nihon Gosei Co., Ltd.) as a dispersion stabilizer in 10 kg of demineralized water were added, in order.

The mixture was stirred for one hour at a room temperature to render the impregnation of styrene, acrylonitrile and benzoyl peroxide into the EPDM. Then, the grafting reaction was allowed at 90 degree centigrade for 6 hours and subsequently at 115 degree centigrade for 2 hours.

After the reaction was over, the resulting product was filtered, washed with water and dried to obtain about 13.3 kg of Graft Rubber (SAg-EPDM).

3) Shell Kagaku's Kraton D1101, if employed in any of the examples, was used as a styrene/butadiene triblock copolymer denoted hereinafter as SBS.

4) Shell Kagaku's Kraton G1651, if employed in any of the examples, was used as a hydrogenated styrene/butadiene/styrene triblock copolymer denoted hereinafter as SEBS.

Polystyrene, if employed in any of the examples herein was either Nippon Polystyrene Kabushiki Kaisha's Esbrite® 500HR-Y3 (high impact polystyrene denoted as HIPS hereinafter).

Metal particles used in the examples herein were as follows.

1) Aluminium flakes:
   aluminium flake color concentrate manufactured by Sumika Color Kabushiki Kaisha, denoted as SPEM-8E408 containing 30 weight % of aluminium flake having average particle size of about 5 microns and aspect ratio of 5.

Copper flakes:
   reagent grade copper flake having particle size under 350 mesh manufactured by Wako Junyaku Kogyo Kabushiki Kaisha.

It should be reasonably expected that a smaller particle sized metal powder should give a better discoloration resistance.

EXAMPLE 1

20 kg of the PPE and 5 kg of SBS as prescribed in the Feed-1 column of Example-1 of Table-1, were premixed using a 100 liter tumbler mixer for 3 minutes, prior to feeding to the first feed opening of TEM-50 twin screw extruder. The premix prepared for the first feed opening will be referred to as the first feed premix hereinafter 25 kg of the nylon 6 and 2.5 kg of SPEM-8E408 as prescribed in the Feed-2 column of Example-1 of Table-1 using the tumbler mixer for 3 minutes prior to the feeding to the second feed opening of TEM-50 twin screw extruder.

The premix prepared for the second feed opening will be referred to as the second feed premix hereinafter. The cylinder temperature of the extruder was set at about 260° C. and the screw speed at about 300 rpm.

The first feed premix was fed to the first feed opening and the second feed premix to the second feed opening, in one hour simultaneously.

The resulting melt blend was cooled in a water bath by chilled water of about 10° C. and pelletized and dried. Thus prepared blend granules were injection molded to make 2 plates of 40 mm×40 mm×3 mm test plates.

Above 70% by weight of aluminium flakes were dispersed in the polyamide.

The test plates were exposed to ultra violet rays having the wave length ranging from 290 to 459 nm and the intensity of 100 mW/cm² for 69 hours at 63° C., using Eysper UV Tester manufactured by Iwasaki Denki Kabushiki Kaisha. After the exposure was completed, the degree of discoloration was measured of each plate using Macbeth Co., Ltd.'s spectrocolorimeter "Macbeth Color Eye MS-2020+", and ΔE was calculated according to the CIE 1976 color difference formula as follows;

$$\Delta E=[(\Delta L^*)^2+(\Delta a^*)^2+(\Delta b^*)^2]^{1/2}$$

wherein $$\Delta L^*=L^*_{-1}-L^*_{-2}$$

$$\Delta a^*=a^*_{-1}-a^*_{-2}$$

$$\Delta b^*=b^*_{-1}-b^*_{-2} \text{ and}$$

$L^*_1$, $a^*_{-1}$, and $b^*_{-1}$ are brightness, degree of red, and degree of yellow respectively measured, of each plate using the spectrocolorimeter prior to the exposure test, and $L^*_{-2}$, $a^*_{-2}$ and $b^*_{-2}$ are ones measured of each plate after the exposure test. Average of ΔE of the two plates is shown in Table-1.

COMPARATIVE EXAMPLE 1

The experiment was conducted in the same manner as in Example-1 except that aluminium flakes were substituted with 1.5 kg of the gray pigment [PAMSE626 manufactured by Sumika Color kabushiki kaisha]

EXAMPLE 2

The experiment was conducted in the same manner as in Example-1 except that 0.25 kg of maleic anhydride and 50 gram of dicumyl peroxide is the free radical initiator were added in the Feed-1 premix.

EXAMPLE 3

The experiment was conducted in the same manner as in Example-2 except that 5 kg of aluminium flakes were added instead of 2.5 kg of SPEM-8E408 in the Feed 2 premix.

EXAMPLE 4

The experiment was conducted in the same manner as in Example-3 except that 10 weight percent out of 40 weight percent of PPE was substituted with 10 weight percent of HIPS.

EXAMPLE 5

The experiment was conducted in the same manner as in Example-3 except that SBS was substituted with EPSA.

EXAMPLE 6

The experiment was conducted in the same manner as in Example-2 except that the nylon 6 was substituted with nylon 66 and SBS with EPS.

COMPARATIVE EXAMPLE 2

The experiment was conducted in the same manner as in Example-2 except that aluminium flakes were substituted with the gray pigment.

EXAMPLE 7

The experiment was conducted in the same manner as in Example-2 except that SBS was substituted with SEBS and maleic anhydride with citric acid.

EXAMPLE 8

The experiment was conducted in the same manner as in Example-7 except that 2.5 kg of SPEM=8E408 was substituted with 0.75 kg of the copper flakes.

COMPARATIVE EXAMPLE 3

The experiment was conducted in the same manner as in Example-2 except that SPEM-8E408 was added to the Feed-1.

EXAMPLE 9

50 kg of gray pigmented Noryl GTX-600, a compatibilized PPE/PA blend made and sold by GE Plastics Japan, and 2.5 kg of SPEM-8E408 was premixed by the tumbler, mixed and then melt extruded using TEM-50 twin screw extruder feeding the premix to the first feed opening.

The resulting granules were injection molded to make the 40 mm×40 mm×3 mm test plates and the degree of discoloration was measured in the same manner as in the previous Examples.

COMPARATIVE EXAMPLE 4

The same Noryl GTX600 was injection molded, without adding metal flakes in order to make the test plates, and the degree of discoloration was measured.

EXAMPLE 10

The experiment was conducted in the same manner as in Example-9 except that Noryl GTX was substituted with gray pigmented Xylon A1400, a compatibilized PPE/PA blend made and sold by Asahi Kasei Kogyo Kabushiki Kaisha.

EXAMPLE 11

Additional two test plates were injection molded using the PPE/PA blend prepared in Example-3.

The plates were subjected to paint spray to form a paint layer of about 5 micron, and then were cured for 30 minutes at 70° C. in an infrared paint cure oven. The paint used was "Origiplate Z-NY metalic silver" manufactured by Origin Denki kabushiki Kaisha. Thus cured plates were subjected to ultra violet ray and the degree of discoloration was measured of the plates in the same manner as in the previous examples.

COMPARATIVE EXAMPLE 5

The experiment was conducted in the same manner as in Example-1 except that the PPE/PA blend prepared in Example-3 was substituted with the one prepared in Comparative example-2.

Extraction Test

In order to show the difference between a compatibilized PPE/PA blends and an uncompatibilized PPE/PA blends, the following extraction test was conducted using the PPE/PA blends of Comparative example-1, Example-2, Comparative example-4 (Noryl GTX-600) and Example-10 (Xylon A1400).

The weight percentage of non-extractable (denoted as NE) measured of the four blends were shown in Table-1.

Procedure of Extraction Test 1) 5 g of the pulverized resin composition was extracted by Soxhlet's extraction method using chloroform as extractin solvent for 9 hours.
2) Subsequently, the non-extractable residue was further extracted with 2,2,2-trifluoroethanol for 18 hours in the same manner as Step 1.
3) Subsequently, the non-extractable residue was extracted with chloroform again for 9 hours in the same manner as Step 1.
4) Finally, the non-extractable residue was dried under vacuum at 100° C. for 5 hours and was weighed.
5) The weight of said dried component minus added inorganic component was regarded as non extractable (NE).

TABLE 1

| | Feed-1 | | | | | | | Feed-2 | | | | | |
| --- | --- | --- | --- | --- | --- | --- | --- | --- | --- | --- | --- | --- | --- |
| | | | Compatibilizer | | Initiator | | Impact Modifier | | | Pigment | Metal Powder | | |
| | PPE | HIPS | Identity | Amount | Identity | Amount | Identity | Amount | PA6 | PA66 | PAM8E 626 | Identity | Amount | ΔE | NE |
| Example 1 | 40 | | | | | | SBS | 10 | 50 | | | SPEM-8E408 | 5 | 5.8 | 0 |
| Comparative example 1 | 40 | | | | | | SBS | 10 | 50 | | 3 | | | 11.6 | |
| Example 2 | 40 | | MAH | 0.5 | Dicumyl Peroxide | 0.1 | SBS | 10 | 50 | | | SPEM-8E408 | 5 | 5.7 | 16 |
| Example 3 | 40 | | MAH | 0.5 | Dicumyl Peroxide | 0.1 | SBS | 10 | 50 | | | Aluminium flake | 10 | 4.0 | |
| Example 4 | 30 | 10 | MAH | 0.5 | Dicumyl Peroxide | 0.1 | SBS | 10 | 50 | | | Aluminium flake | 10 | 3.5 | |
| Example 5 | 40 | | MAH | 0.5 | Dicumyl Peroxide | 0.1 | EPSA | 10 | 50 | | | Aluminium flake | 10 | 3.8 | |
| Example 6 | 40 | | MAH | 0.5 | Dicumyl Peroxide | 0.1 | EPS | 10 | | 50 | | SPEM-8408 | 5 | 5.4 | |
| Comparative example 2 | 40 | | MAH | 0.5 | Dicumyl Peroxide | 0.1 | SBS | 10 | 50 | | 3 | | | 10.6 | |
| Example 7 | 40 | | Citric acid | 0.5 | Dicumyl Peroxide | 0.1 | SEBS | 10 | 50 | | | SPEM-8E408 | 5 | 5.1 | |
| Example 8 | 40 | | Citric acid | 0.5 | Dicumyl Peroxide | 0.1 | SEBS | 10 | 50 | | | Cu flake | 1.5 | 7.6 | |
| Comparative example 3 | 40 | | MAH | 0.5 | Dicumyl Peroxide | 0.1 | SEBS | 10 | 50 | | | SPEM-8E408 | 5(from Feed-1) | 9.8 | |
| Example 9 | NORYL GTX600 100 | | | | | | | | | | | SPEM-8E408 | 5 | 5.5 | |
| Comparative example 4 | NORYL GTX600 100 | | | | | | | | | | | | | 13.1 | 12 |
| Example 10 | XYLON A1400 100 | | | | | | | | | | | SPEM-8E408 | 5 | 5.3 | 20 |
| Example 11 | Same as example-3 with paint coated | | | | | | | | | | | | | 0.1 | |
| Comparative example 5 | Same as comparative example-2 with paint coated | | | | | | | | | | | | | 2.0 | |

We claim:

1. A resin composition having improved resistance to discoloration caused by exposure to light, which comprises (a) 5-95% by weight of a polyphenylene ether alone or in combination with a styrene polymer, (b) 95-5% by weight of a polyamide, and based on 100 parts by weight of the sum of (a) and (b), (c) 0.01-30 parts by weight of one or more agents to improve the compatibility of a polyphenylene ether and a polyamide, (d) 0-50 parts by weight of one or more agents to improve the impact resistance, and (e) 0.1-15 parts by weight of metal particles having a weight average particle size of up to 10 μm and an aspect ratio of at least 3, wherein said metal particles are in the form of flakes or powders, and said metal is at least one member selected from the group consisting of aluminum, magnesium, zinc, nickel, stainless steel, chromium and copper, and 60% by weight or more of (e) metal particles being included in (b) a polyamide, wherein in said resin composition an insoluble is present in an amount greater than 5 percent by weight based on the total of the polymeric components (a), (b) and (d), wherein said insoluble is not soluble in chloroform and 2,2,2-trifluoroethanol.

2. A resin composition according to claim 1 wherein the metal particles (e) are selected from flakes and powders of aluminium, magnesium, zinc, nickel, stainless steel, chromium and copper.

3. A resin composition according to claim 1 wherein the polyamide (b) is present in an amount from about 35 percent by weight to about 80 percent by weight in total of the polymeric components (a), (b) and (d).

4. A resin composition according to claim 1 wherein the polyamide (b) is selected from polyamide 6, polyamide 6/6, polyamide 6/4, polyamide 6/10, polyamide 6/12, polyamide 11 and polyamide 12.

5. A resin composition according to claim 1 wherein the polyphenylene ether (a) is selected from poly(2,6-dimethyl-1,4-phenylene) ether and a copolymer of 2-6 dimethyl phenol and 2,3,6-trimethyl phenol.

6. A resin composition according to claim 1 wherein the polyphenylene ether (a) is present in an amount from about 20 percent by weight to about 65 percent by weight to about 65 percent by weight in the total of the polymeric components (a), (b) and (d).

7. A fabricated article for outdoor use made from a resin composition according to claim 1.

8. A resin composition according to claim 1 wherein the polyphenylene ether (a) has a reduced viscosity of 0.25–0.70 dl/g measured at 25° C. in a chloroform solution of 0.5 g/dl concentration.

9. A resin composition according to claim 1 wherein the polyamide (b) has a number average molecular weight of 10,000–50,000.

* * * * *